United States Patent [19]

Rinehart et al.

[11] Patent Number: 5,036,126
[45] Date of Patent: Jul. 30, 1991

[54] FLAME RETARDANT BLENDS OF POLYCARBONATE, ABS AND A TERPOLYMER

[75] Inventors: Michael K. Rinehart, Parkersburg, W. Va.; James J. Ziegelmeyer, Henny, Ill.

[73] Assignee: General Electric Company, Parkersburg, W. Va.

[21] Appl. No.: 529,369

[22] Filed: May 30, 1990

[51] Int. Cl.$^5$ .......................... C08J 5/52; C08K 5/52; C08L 5/52
[52] U.S. Cl. .................................. 524/141; 524/143; 524/145; 525/72; 525/148; 526/293
[58] Field of Search ................. 524/141, 143, 145, 72, 524/148; 526/293

[56] References Cited

U.S. PATENT DOCUMENTS

| | | | |
|---|---|---|---|
| 3,130,177 | 4/1964 | Grabowski | 525/67 |
| 3,162,695 | 12/1964 | Grabowski | 525/67 |
| 4,205,140 | 5/1980 | Liebig et al. | 525/67 |
| 4,218,544 | 8/1980 | Henton | 525/67 |
| 4,472,554 | 9/1984 | Grigo et al. | 525/67 |
| 4,886,855 | 12/1989 | Parsons | 525/67 |

FOREIGN PATENT DOCUMENTS 135492  3/1985  European Pat. Off.
135493  3/1985  European Pat. Off.

*Primary Examiner*—Paul R. Michl
*Assistant Examiner*—U. K. Rajguru
*Attorney, Agent, or Firm*—Lowe, Price, LeBlanc & Becker

[57] ABSTRACT

Flame retardant polymer blend compositions comprise a polycarbonate polymer, an ABS resin, a phosphate ester flame retardant and a terpolymer formed from an aryl brominated monovinylic aromatic monomer, an ethylenically unsaturated nitrile monomer, and an alkyl methacrylate monomer in which the alkyl group has from 1 to 4 carbon atoms. A preferred terpolymer comprises a dibromostyrene-acrylonitrile-methyl methacrylate terpolymer.

20 Claims, No Drawings

FLAME RETARDANT BLENDS OF POLYCARBONATE, ABS AND A TERPOLYMER

FIELD OF THE INVENTION

The present invention relates to flame retardant blends of polycarbonate and ABS resin. More particularly, the present invention relates to flame retardant polymer blend compositions comprising a polycarbonate, an ABS resin, a phosphate ester flame retardant and a rigid terpolymer which increases the flame retardant properties of the compositions.

BACKGROUND OF THE INVENTION

Polymer blend compositions for use in engineering applications should exhibit a combination of physical properties such as heat resistance, good impact strength and good modulus. Additionally, the blend compositions should exhibit good melt flow properties which facilitate processing and molding of the blend compositions. Polycarbonates are popular blend components owing to their toughness and relatively high softening temperatures. However, owing to their relatively poor melt flow characteristics, polycarbonates are often blended with one or more additional polymers to improve their melt flow properties. Examples of such blend compositions include the Grabowski U.S. Pat. No. 3,130,177 which discloses blends of polycarbonates with polybutadiene, styrene, acrylonitrile graft polymers and the Grabowski U.S. Pat. No. 3,162,695 which discloses blends of polycarbonates with butadiene-styrene, methyl methacrylate, styrene graft copolymers. The Parsons U.S. Pat. No. 4,886,855 discloses blends of polycarbonate, ABS resin and styrene polymers which exhibit a good combination of physical properties. The Liebig et al U.S. Pat. No. 4,205,140 also discloses a thermoplastic molding composition comprising a blend of a polycarbonate, a diene rubber graft polymer such as ABS, and a styrene polymer. Similar blends of polycarbonate with styrenemaleic anhydride copolymer, ABS resin and styreneacrylonitrile random copolymer are disclosed in the Henton U.S. Pat. No. 4,218,544. The Grigo et al U.S. Pat. No. 4,472,554 discloses thermoplastic molding compositions comprising a blend of a polycarbonate, a graft polymer such as ABS and a polymeric acidifying agent. European Patent Applications Nos. 135,492 and 135,493 also disclose polymer blends of polycarbonates, ABS polymers and styrene polymers. These blends exhibit various physical properties depending on the type and ratio of components included therein.

It is also desirable that such polymer blend compositions exhibit flame retardant properties for use in various applications. While the addition of conventional flame retardant compounds provides a degree of flame retardancy to such polymer compositions, the addition of reasonable amounts of such conventional compounds does not provide sufficient flame retardancy to allow thin samples of the blend compositions (for example, sheets of a thickness of 0.060 inches) to pass such flammability tests as the UL 94 V or the UL 94 5V tests with VO ratings because of material dripping. The UL tests are standard test procedures of the Underwriters Laboratory to measure the flame retardant properties of a material. It has been known to include halogenated polymer components in such compositions in order to improve the flame retardant characteristics of the compositions. For example, ABS resins including one or more halogenated styrene components have been proposed for use in polycarbonate compositions. However, large amounts of the halogenated polymer component must often be included in order to achieve the desired flame retardant properties whereby one or more physical properties of the compositions are disadvantageously compromised.

Accordingly, a need exists for improved compositions of polycarbonate and ABS resin which exhibit satisfactory flame retardant properties without sacrificing the advantageous physical properties of such compositions.

SUMMARY OF THE INVENTION

Accordingly, it is an object of the present invention to provide polymer blend compositions comprising a polycarbonate polymer and an ABS resin, which compositions exhibit good flame retardant properties. It is a related object of the invention to provide polymer blend compositions of polycarbonate polymer and ABS resin which exhibit improved flame retardant properties as demonstrated by the UL 94 V and/or UL 94 5V tests. It is a further object of the invention to provide such compositions which also exhibit an advantageous combination of physical properties.

These and additional objects are provided by the polymer blend compositions of the invention which comprise a polycarbonate polymer, an ABS resin, a phosphate ester flame retardant and a terpolymer. The terpolymer is formed from an aryl brominated monovinylic aromatic monomer, an ethylenically unsaturated nitrile monomer, and an alkyl methacrylate monomer in which the alkyl group has from 1 to 4 carbon atoms. A preferred terpolymer comprises a dibromostyrene-acrylonitrile-methyl methacrylate terpolymer. The terpolymer provides the compositions with improved flame retardant properties without detracting from the various advantageous physical properties of the compositions.

These and additional objects and advantages provided by the present invention will be more fully understood in view of the following detailed description.

DETAILED DESCRIPTION

The polymer blend compositions according to the present invention exhibit good flame retardant properties and good physical properties including impact strength and modulus and good processing properties. The compositions comprise a polycarbonate polymer, an ABS resin, a phosphate ester flame retardant and a terpolymer.

The polycarbonate component included in the blend compositions may be any aliphatic or aromatic homopolycarbonate or co-polycarbonate known in the art. The polycarbonate component may be prepared in accordance with any of the processes generally known in the art, for example, by the interfacial polycondensation process, by polycondensation in a homogeneous phase or by transesterification. These processes and the associated reactants, catalysts, solvents and conditions are well known in the art and are described in U.S. Pat. Nos. 2,964,974; 2,970,137; 2,999,835; 2,999,846; 3,028,365; 3,153,008; 3,187,065; 3,215,668; and 3,258,414, all of which are incorporated herein by reference. Suitable aromatic polycarbonates are based, for example, on one or more of the following bisphenols: dihydroxy diphenyls, bis-(hydroxyphenyl)-alkanes, bis- (hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphoxides, bis-(hydroxyphenyl)sulphones, $\alpha,\alpha$-bis-(hydroxyphenyl)-diisopropyl benzenes, and their nucleus-alkylated and nucleus-halogenated derivatives, and mixtures thereof.

Specific examples of these bisphenols are 4,4,dihydroxy diphenyl, 2,2-bis-(4-hydroxyphenyl)-propane, 2,4-bis-(4-hydroxyphenyl)-2-methyl butane, 1,1-bis-(4-hydroxyphenyl)-cyclohexane, $\alpha,\alpha$-bis-(4-hydroxyphenyl)-p-diisopropyl benzene, 2,2-bis(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-(3,5-dimethyl-4-hydroxyphenyl)-2-methyl butane, 1,1,-bis-(3,5-dimethyl-4-hydroxyphenyl)-cyclohexane, $\alpha,\alpha$-bis-(3,5-dimethyl-4-hydroxyphenyl)-p-diisopropyl benzene, 2,2-bis-(3,5-dichloro-4-hydroxyphenyl)-propane and 2,2-bis-(3,5-dibromo-4-hydroxyphenyl)-propane. A particularly preferred bisphenol is 2,2-bis-(4-hydroxyphenyl)-propane, more commonly known as bisphenol A.

The ABS resin comprises a rigid graft polymer grafted to a diene rubber substrate. In a preferred embodiment, the rigid graft polymer is formed from styrene and acrylonitrile and the diene rubber substrate comprises polybutadiene. However, it is well within the scope of the present invention to employ an ABS resin in which the rigid polymer is formed from a monovinylidene aromatic monomer other than styrene, for example, using one or more substituted styrenes, and from acrylate or methacrylate monomers in place of acrylonitrile as is well known in the art. Additionally, the ABS resin may include diene rubbers other than polybutadiene as is well known in the art. In the context of the present application, reference to the ABS resin component will also include these equivalent polymers. It is noted however that ABS resin comprising a rigid graft polymer formed from styrene and acrylonitrile grafted to polybutadiene is the preferred ABS resin. In this preferred embodiment, it is further preferred that the weight ratio of styrene to acrylonitrile in the rigid graft portion of the ABS resin is in the range of about 1:1 to about 5:1 so that the amount of styrene is equal to or greater than the amount of acrylonitrile included in the graft portion. The ABS resin component may be prepared according to methods also well known in the art. As is known in the art, methods of producing ABS resin may result in a product comprising a mixture of ABS graft and ungrafted rigid copolymer, for example, ungrafted styreneacrylonitrile copolymer. These mixtures are also suitable for use in the invention.

The ABS resin should contain at least 40 weight percent, and preferably 50 weight percent, of the diene rubber substrate in order to contribute to the advantageous physical properties of the compositions. In a preferred embodiment, the ABS resin comprises from about 50 to about 75 weight percent of the diene rubber substrate.

The phosphate ester flame retardant which is included in the polymer blend compositions of the present invention may comprise any of such compounds which are known in the art for use in polymer systems. Suitable phosphate ester flame retardants include monophosphate compounds and diphosphate compounds. Preferred flame retardants comprise triaryl phosphates, alkylaryl phosphates and trialkyl phosphates. Examples of these phosphates include triphenyl phosphate and isopropyl triphenyl phosphate, with triphenyl phosphate being a particularly preferred compound for use as the phosphate ester flame retardant.

The terpolymer, in combination with the phosphate ester flame retardant, provides the compositions of the present invention with improved flame retardant properties. The terpolymer is formed from an aryl brominated monovinylic aromatic monomer, an ethylenically unsaturated nitrile monomer, and an alkyl methacrylate monomer in which the alkyl group has from 1 to 4 carbon atoms. The terpolymer, and methods for its production, are disclosed in the copending Rinehart et al application Ser. No. 07/454,543 filed Dec. 21, 1989, the contents of which are incorporated herein by reference. Preferably, the terpolymer is formed from about 55 to about 75 weight percent of the aryl brominated monovinylic aromatic monomer, from about 15 to about 25 weight percent of the ethylenially unsaturated nitrile monomer, from about 10 to about 20 weight percent of the alkyl methacrylate monomer. In additionally preferred embodiments, the aryl brominated monovinylic aromatic monomer comprises dibromostyrene, the ethylenically unsaturated nitrile monomer comprises acrylonitrile and the alkyl methacrylate monomer comprises methyl methacrylate.

In a further embodiment, the terpolymer may be formed from at least one additional monomer component, for example, a non-halogenated styrene monomer such as styrene, alpha-methylstyrene and/or one or more additional nonhalogenated, substituted styrene monomers. The additional monomer may be included in amounts of up to about 10 weight percent of the terpolymer components.

The polymer blend compositions of the present invention include the four essential components, namely, the polycarbonate polymer, the ABS resin, the phosphate ester flame retardant and the terpolymer in amounts which provide the compositions with good physical properties and good flame retardant properties. Preferably, the terpolymer is included in an amount sufficient to improve the flame retardant properties of the compositions as measured by the UL 94 V test. The compositions according to the present invention have been employed to produce sheet materials of very thin sections, for example, 0.060 inches, exhibiting very good flammability resistance.

In a preferred embodiment, the compositions according to the present invention comprise from about 20 to about 90 weight percent of the polycarbonate polymer, from about 5 to about 75 weight percent of the ABS resin, from about 1 to about 25 weight percent of the phosphate ester flame retardant, and from about 4 to about 50 weight percent of the terpolymer. More preferably, the compositions according to the present invention comprise from about 50 to about 85 weight percent of the polycarbonate component, from about 5 to about 40 weight percent of the ABS resin, from about 5 to about 20 weight percent of the phosphate ester flame retardant, and from about 5 to about 40 weight percent of the terpolymer.

The blend compositions of the invention may be produced according to conventional methods employing conventional mixing and compounding apparatus including, for example, single and twin-screw extruders, mixing rolls and internal mixers. The blend compositions may also include various conventional additives including, among others, stabilizers, lubricants, flow aids, mold release agents, antistatic agents, fillers, glass fibers, pigments and the like. Suitable additives may also include an anti-drip agent, for example, polytetrafluoroethylene, and/or synergistic salts, for example, potassium diphenylsulfone sulfonate (KSS), STB and the like.

The compositions according to the present invention are illustrated by the following example.

EXAMPLE

In this example, compositions 1–4 were prepared according to the present invention and contained a polycarbonate polymer (PC), an ABS resin (ABS), a terpolymer according to the present invention formed from dibromostyrene, acrylonitrile and methyl methacrylate (Terpolymer), and a phosphate ester flame retardant comprising triphenyl phosphate (TPPA). A comparative composition 5 was prepared comprising the polycarbonate, the phosphate ester flame retardant and an a ABS resin containing dibromostyrene (DABS). The amounts of the respective components contained in each composition are set forth in parts by weight in the Table. Each of compositions 1–5 also contained approximately two parts by weight of a combination of an antioxidant, an antidrip agent and stabilizers. The amount of dibromostyrene contained in the terpolymer of compositions 1–4 and in the DABS resin of comparative composition 5 where varied so that each of compositions 1–5 contained an equivalent amount of bromine.

Compositions 1–5 were subjected to measurement of the glass transition temperature (Tg) according to ASTM-D3418-82, the Izod Impact strength according to ASTM-D256, the tensile and flexural properties according to ASTM-D638, and the melt viscosity according to ASTM -D3835-79. Thin sheets of each composition having a thickness of 0.062 inches were also subjected to measurement of their flammability according to UL 94 V. The results of these measurements are also set forth in the Table.

TABLE

| Composition | 1 | 2 | 3 | 4 | 5 |
|---|---|---|---|---|---|
| PC | 44.4 | 44.7 | 47.4 | 35.0 | 35.0 |
| ABS | 30.0 | 20.0 | 10.0 | 15.0 | — |
| Terpolymer | 25.6 | 25.6 | 25.6 | 50.0 | — |
| DABS | — | — | — | — | 65.0 |
| TPPA | 6.0 | 6.0 | 6.0 | 6.0 | 6.0 |
| Tg(°C.) | 101 | 96 | 93 | 96 | 95 |
| Izod Impact (ft-lb/in) | 11.0 | 9.9 | 6.0 | 6.9 | 13.4 |
| Tensile Properties | | | | | |
| Strength (psi) | 6345 | 7170 | 7830 | 7110 | 6450 |
| Modulus ($\times 10^5$) | 3.07 | 3.78 | 4.30 | 4.07 | 3.40 |
| Elongation (%) | 54 | 49 | 42 | 40 | 47 |
| Flexural Properties | | | | | |
| Strength (psi) | 10130 | 11680 | 13440 | 12200 | 10680 |
| Modulus ($\times 10^5$) | 3.4 | 3.6 | 4.3 | 4.0 | 3.6 |
| Melt Viscosity (475° F., poise) | | | | | |
| 100 sec$^{-1}$ | 9184 | 5795 | 3983 | 3931 | 6164 |
| 500 sec$^{-1}$ | 4344 | 2929 | 2232 | 2161 | 2819 |
| 1000 sec$^{-1}$ | 2871 | 1985 | 1591 | 1696 | 1886 |
| 1500 sec$^{-1}$ | 2218 | 1605 | 1316 | 1447 | 1545 |
| Flammability | | | | | |
| UL 94 V (0.062") | | | | | |
| Flame Class | V-0 | V-0 | V-0 | V-0 | V-2 |
| Average burn (sec) | 2.0 | 1.5 | 1.0 | 1.0 | 9.0 |
| Maximum burn (sec) | 5 | 3 | 1 | 1 | 36 |
| Number drips | 0/5 | 0/5 | 0/5 | 0/5 | 4/5 |

The results set forth in the Table demonstrate that compositions 1–4 according to the present invention exhibited significantly improved flammability resistance as compared with comparative composition 5. Additionally, compositions 1–4 according to the present invention exhibited an advantageous combination of physical properties.

The examples and preferred embodiments set forth above are not intended to limit the scope of the compositions of the invention. Additional embodiments and advantages within the scope of the invention will be apparent to one of ordinary skill in the art.

What is claimed is:

1. A polymer blend composition, comprising a polycarbonate polymer, an ABS resin, a phosphate ester flame retardant and a terpolymer formed from an aryl brominated monovinylic aromatic monomer, an ethylenically unsaturated nitrile monomer, and an alkyl methacrylate monomer in which the alkyl group has from 1 to 4 carbon atoms.

2. A polymer blend composition as defined by claim 1, wherein the terpolymer is included in an amount sufficient to improve the flame retardant properties of the composition as measured by the UL 94 V test.

3. A polymer blend composition as defined by claim 1, comprising from about 20 to about 90 weight percent of the polycarbonate polymer, from about 5 to about 75 weight percent of the ABS resin, from about 1 to about 25 weight percent of the phosphate ester flame retardant, and from about 4 to about 50 weight percent of the terpolymer.

4. A polymer blend composition as defined by claim 1, comprising from about 50 to about 85 weight percent of the polycarbonate, from about 5 to about 40 weight percent of the ABS resin, from about 5 to about 20 weight percent of the phosphate ester flame retardant, and from about 5 to about 40 weight percent of the terpolymer.

5. A polymer blend composition as defined by claim 1, wherein the polycarbonate polymer comprises an aromatic polycarbonate.

6. A polymer blend composition as defined by claim 1, wherein the polycarbonate is formed from a bisphenol.

7. A polymer blend composition as defined by claim 6, wherein the polycarbonate is formed from bisphenol-A.

8. A polymer blend composition as defined by claim 1, wherein the ABS resin comprises a polymer of styrene and acrylonitrile grafted to a diene rubber substrate.

9. A polymer blend composition as defined by claim 8, wherein the ABS resin comprises at least 40 weight percent of the diene rubber substrate.

10. A polymer blend composition as defined by claim 8, wherein the ABS resin comprises at least 50 weight percent of the diene rubber substrate.

11. A polymer blend composition as defined by claim 8, wherein the ABS resin further includes free, ungrafted styrene-acrylonitrile polymer.

12. A polymer blend composition as defined by claim 1, wherein the phosphate ester flame retardant is selected from the group consisting of triaryl phosphates, trialkyl phosphates and alkylaryl phosphates.

13. A polymer blend composition as defined by claim 12, wherein the phosphate ester flame retardant comprises triphenyl phosphate.

14. A polymer blend composition as defined by claim 1, wherein the terpolymer is formed from about 55 to about 75 weight percent of the aryl brominated monovinylic aromatic monomer, from about 15 to about 25 weight percent of the ethylenically unsaturated nitrile monomer, and from about 10 to about 20 weight percent of the alkyl methacrylate monomer.

15. A polymer blend composition as defined by claim 14, wherein the aryl brominated monovinylic aromatic monomer comprises dibromostyrene.

16. A polymer blend composition as defined by claim 14, wherein the ethylenically unsaturated nitrile monomer comprises acrylonitrile.

17. A polymer blend composition as defined by claim 14, wherein the alkyl methacrylate monomer comprises methyl methacrylate.

18. A polymer blend composition as defined by claim 14, wherein the terpolymer is formed from dibromostyrene, acrylonitrile and methyl methacrylate.

19. A polymer blend composition as defined by claim 18, wherein the terpolymer further includes a non-halogenated styrene monomer.

20. A polymer blend composition, comprising from about 50 to about 85 weight percent of a polycarbonate polymer, from about 5 to about 40 weight percent of an ABS rein, from about 5 to about 20 weight percent of a phosphate ester, and from about 5 to about 40 weight percent of a dibromostyrene-acrylonitrile-methyl methacrylate terpolymer.

* * * * *